Nov. 1, 1960 R. M. CARRIER, JR., ET AL 2,958,228
RESONANT VIBRATION EXCITER
Filed Oct. 24, 1956 2 Sheets-Sheet 1
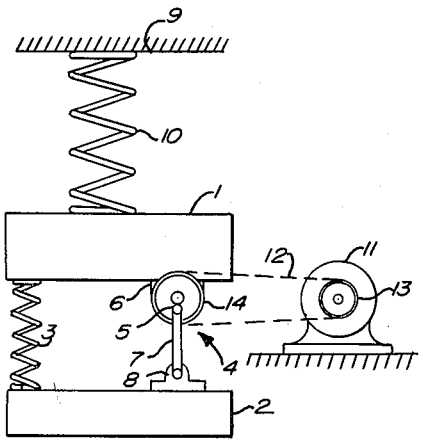
Fig. I
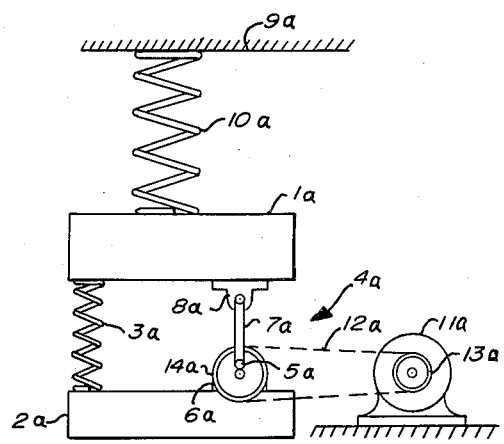
Fig. II
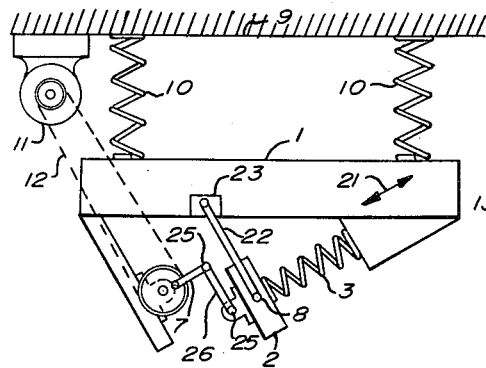
Fig. IV
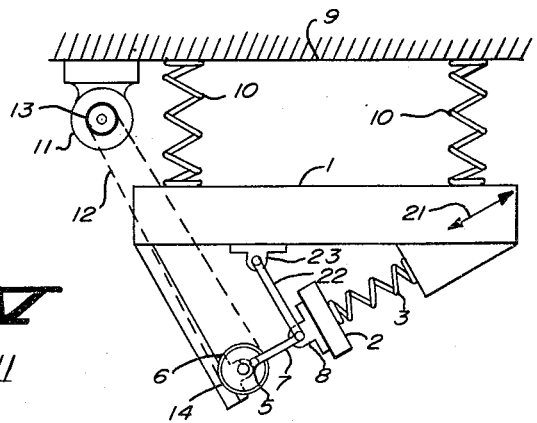
Fig. III
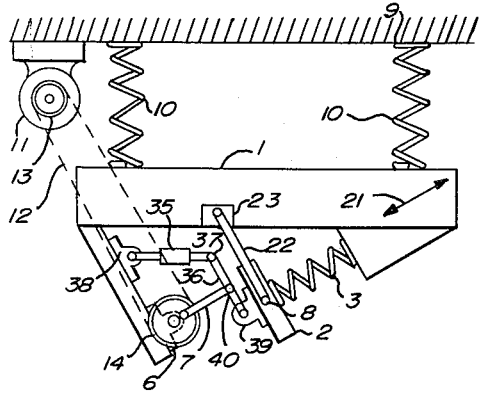
Fig. V
INVENTORS
ROBERT M. CARRIER JR.
JOHN M. MORRIS
BY
*Marshall, Marshall & Heasting*
ATTORNEYS Nov. 1, 1960 R. M. CARRIER, JR., ET AL 2,958,228
RESONANT VIBRATION EXCITER
Filed Oct. 24, 1956 2 Sheets-Sheet 2
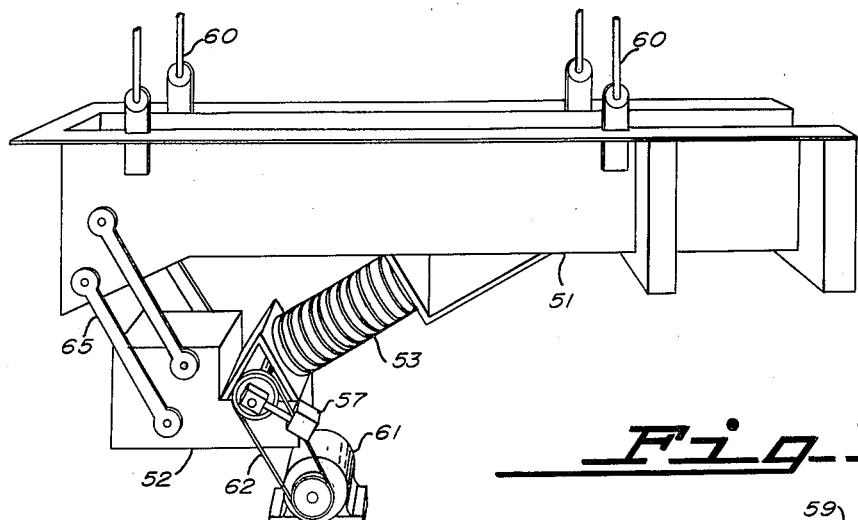
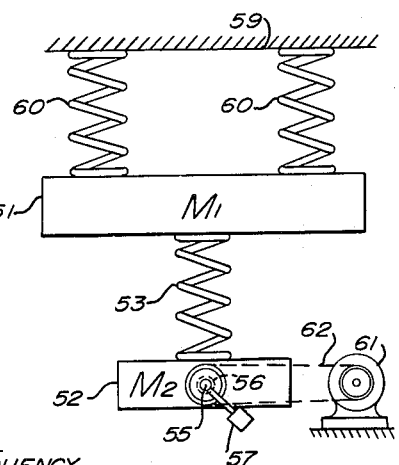
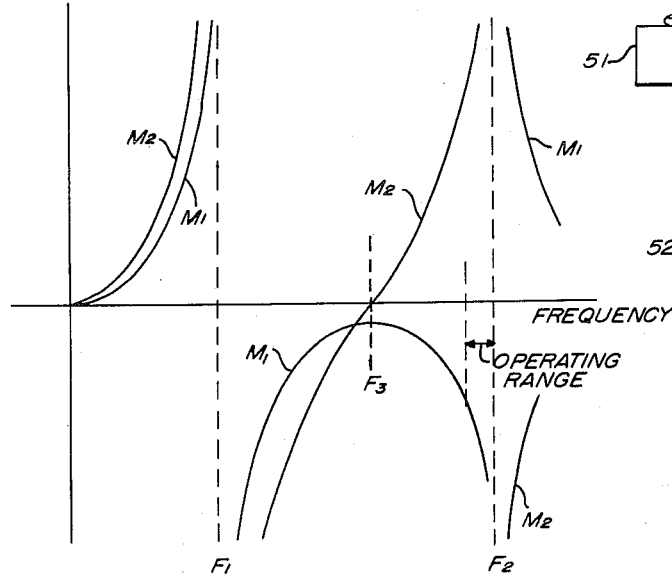
INVENTORS
ROBERT M. CARRIER JR.
JOHN M. MORRIS
BY
Marshall, Marshall & Hasting
ATTORNEYS

United States Patent Office

2,958,228
Patented Nov. 1, 1960

2,958,228

RESONANT VIBRATION EXCITER

Robert M. Carrier, Jr., and John M. Morris, Louisville, Ky., assignors, by mesne assignments, to Chain Belt Company, Milwaukee, Wis., a corporation of Wisconsin Filed Oct. 24, 1956, Ser. No. 618,126

7 Claims. (Cl. 74—26)

The present invention relates generally as indicated to a resonant vibration exciter and more particularly to an exciter wherein a member to which the exciter is attached is arranged to perform useful work such as conveying, screening, mixing, compacting, blending, drilling, crushing, de-watering, car unloading, and other processing or mechanical applications.

Machines utilizing mechanically, pneumatically, or electromagnetically created vibrations have a number of varied uses as above indicated, but heretofore these machines have, for the most part, been unable to employ natural frequency vibrations to advantage because of failure either to provide for control of the amplitude of vibration or to provide means for limiting the magnitude of the vibrational forces imposed on the exciting means during operation and during the starting and stopping periods. Both of the foregoing conditions must be satisfied if the full benefit of resonant vibration is to be utilized.

In the case of machines having electromagnetically or pneumatically created vibration, in which the vibratory impulse is timed to be in phase with the vibration whereby the amplitude of vibration of the work-producing member is determined solely by its damping and by the magnitude of the impulse; and, therefore, if this type of machine which operates at the natural frequency of its resilient supporting means and is so powered that the amplitude of vibration is within structurally safe limits, the imposing of external work load thereon causes appreciable dampening of the amplitude of vibration and thus inability to perform any substantial amount of useful work.

Furthermore, if, during the above-mentioned dampened condition of the machine, the magnitude of the electromagnetic or pneumatic impulse is increased so as to maintain desired amplitude of vibration under external work load, the removal of such load causes multiplication of the amplitude of vibration and consequent imposition of self-destructive internal stresses in the members constituting the vibrating system. For the foregoing reasons, machines having electromagnetically or pneumatically created vibrations usually are designed with separate frequency control for operation at frequencies considerably removed from the resonant frequency of the system. In other words, when such machines are operated at non-resonant frequency, dampening is not so critical, and a reasonable change in work load does not cause a wide variation in amplitude of vibration. This control is gained at the expense of inefficient use of the vibration generator.

In mechanically excited machines which employ, for example, rapidly rotating eccentric weights either singly or in oppositely turning pairs, the centrifugal forces created by the rotating eccentric weights produce vibratory impulses. When said eccentric weights are attached directly to a resiliently supported work-producing member or to an intermediate base member located between the work-producing member and the earth or other fixed support, and elastically connected to said work-producing member, useful vibratory motion of said work-producing member is produced. However, because the centrifugal forces of the rotating eccentric weights act only on a member of the vibratory system that vibrates at small amplitude with large forces, the amplitude of vibration of the work member is not positively controlled and is determined principally by the inertia and damping of the vibrating masses and the magnitude of the centrifugal forces. When the eccentric weights are fixedly attached to and vibrate with the work-producing member, the relatively large magnitude of the centrifugal forces causes the shaft bearings to "peen" rapidly.

On the other hand, when the eccentric weights are attached to an intermediate base member as aforesaid, the shaft bearings, while remaining comparatively stationary, are still subject to centrifugal forces generally equal to the force required to overcome the inertia force of the work member.

Furthermore, as in the case of electromagnetically or pneumatically created vibrations, the rotating mass created vibrations do not alone provide a positive control of the amplitude of vibration; and, therefore, if the machines are operated at resonance, the work-producing member will be subject to critical dampening under the influence of external work load or else the machines will be subjected to self-destructive internal stresses if the external restraint of the work load is removed.

Certain other types of vibration-producing devices employ an eccentric shaft journaled on a separate foundation or frame and connected by a connecting rod to one or more of the vibrating members to maintain positive control of the amplitude of vibration whereby, when these devices are operated at resonance, dampening will not occur regardless of the magnitude of the external work load; nor will the amplitude of vibration exceed structurally safe limits when the work load is removed.

However, hitherto, certain of these vibration-producing devices have lacked a suitably designed yieldable connecting means between the eccentric shaft and the work-producing member; and, therefore, these devices to successfully operate at resonance have required great strength in the bearings and connecting rods because of the self-destructive magnitude of the stresses during the starting and stopping period. In other words, when the weight of the vibrating mass, that is, the work-producing member, is relatively large, the energy stored in the vibrating system at resonance will be extremely high; and when the power is withdrawn from the eccentric shaft, two diametrically opposite actions tend to take place, viz.

(1) The vibrating mass attempts to come to rest with gradually decreasing amplitude and constant frequency, and (2) The rotating eccentric shaft tends to come to rest with gradually decreasing frequency and constant amplitude.

Under these starting and stopping conditions, the inertia forces from the vibrating mass which at resonance is balanced by the resilient connecting springs is directly impressed on the eccentric shaft and its bearings to the extent that long operating life cannot be expected; and, for this reason, prior art machines employing rotating eccentric cranks with crank arms connected to the work-producing members to create positively controlled amplitudes of vibration usually operate as a simple crank and piston device with the inertia forces always transmitted through the crank and connecting rod.

Before proceeding with the objects of the present invention, it is to be understood that for the purposes of the ensuing discussion, a "resonant" machine is one which operates at a frequency substantially equal to a natural frequency of the vibratory system comprising the vibrated members and their connecting springs. In a vibrating system having two degrees of freedom, there are two modes of vibration giving two natural frequencies. Operation of such system at a frequency intermediate the two natural frequencies, while sometimes referred to as operating in the "wide resonant range"; is not true resonant operation.

In view of the foregoing and other deficiencies in know types of vibrating machines, it is one primary object of this invention to provide a machine wherein vibrations of relatively large magnitude are efficiently produced and accurately controlled.

It is another object of this invention to provide a machine for vibratory treatment of materials and other useful work while, at the same time, substantially preventing the transmission of vibrations to the supporting structure for the machine or to the earth.

Another object of this invention is to provide a resonant vibration exciter in which substantially the entire input energy is utilized for the production of useful work without substantial dissipation internally or to the supporting structure or earth.

Another object of this invention is to provide a resonant vibration exciter for producing vibrations in such a way that the impressed cyclical forces, as compared with the forces in non-resonant machines, are relatively small with the result that the loads on and the consequent wear of the eccentric bearings and eccentric shaft or equivalent drive means are relatively small.

Another object of this invention is to provide a vibration-producing mechanism of extremely simple design which has but a few moving parts.

Another object of this invention is to provide a resonant vibration exciter which produces vibration of substantially uniform amplitude regardless of the magnitude of the external restraint imposed by the work load.

Another object of this invention is to provide a resonant vibration exciter which produces vibration of substantially uniform amplitude so that the deflections of the moving parts are maintained within safe limits regardless of the external work load or the frequency of the impressed cyclical forces.

Another object of this invention is to provide a resonant vibration-producing mechanism having yieldable connecting means for reducing the starting or non-resonant power to a minimum and for yielding during the stopping period when the internal forces are extremely high as previously indicated.

Another object of this invention is to provide a resonant vibration exciter having a positively controlled amplitude of vibration throughout the normal operating range of frequency together with an elastic connecting means which yields under the effect of large non-resonant forces during the starting and stopping periods thereby reducing the starting power to a minimum and limiting the forces impressed on the eccentric shaft and the eccentric shaft bearings during the stopping period.

Other objects and advantages of the present invention will become apparent as the following description proceeds.

According to the invention an improved vibratory force generating means for applying vibratory force to a resiliently supported work member that does work by vibration comprises an impulse member having a mass less than the mass of the work member, one or more springs for connecting the impulse member to the work member and forming with the impulse member a vibratory system the spring force of which drives the work member, and means for applying a small periodic force to the impulse member, as may be required to maintain it in vibration. The impulse member preferably has a mass from five to fifty percent of the mass of the work member, and the connecting spring is arranged so that the natural or resonant frequency of the impulse member and the spring, allowing for the driven movement of the work member, is equal to the desired frequency of vibration of the work member. The small periodic force having a frequency equal to the desired frequency of vibration may be produced by a crank and connecting rod assembly acting between the impulse member and the work member or a separate support. The force may also be produced by an eccentric weight on the shaft or a weight, either liquid or solid, driven around a circular path on the impulse member. When the crank and connecting rod assembly is used the effective connecting rod is made yieldable to limit the maximum force that can be transmitted. When the eccentric weight, or its equivalent is used, the mass of the eccentric weight and the impulse member is selected according to the mass and damping of the work member and speed of operation to control the amplitude of vibration. In all forms of the invention the periodic driving force applied to the impulse member is small compared to the force transmitted through the spring to the work member.

Commercially practical vibratory machines such as conveyors, mixers, screens, etc., must satisfy several requirements. First, they must not transmit large vibratory forces to surrounding structures since such forces produce undesirable disturbances and noise as well as drain energy from the vibrating system. This requirement is met according to well known engineering practice by making the system self-contained and carrying it on an undampened resilient support. The resilient support with the total mass of the apparatus forms a vibratory system having a low natural frequency of interest only as it affects starting and stopping of the system. Second, the machines shall operate at controllable amplitudes of vibration with reasonable efficiency. Third, the machines shall be simple in construction and reliable in operation.

A common characteristic of most vibratory machines is that the force required to overcome the inertia of the work member is very large compared to the force required to overcome the friction losses or work effort of the work member. Thus, when a crank and connecting rod system is used and connected between the work member and the supporting frame all of the accelerating force (to overcome the inertia) is transmitted through the connecting rod and bearings and the reaction force on the frame causes corresponding vibration in surrounding structures. According to one aspect of the invention a small mass, called the impulse member, is connected to the work member by means of a crank and connecting rod and the reaction force of driving the small mass through a large distance is used to drive the work member through the desired working stroke, and a coupling spring, connected between the work member and the impulse member, is adjusted to supply the accelerating forces thus relieving the crank bearings of this load. The invention contemplates, in one form, a reduction in the maximum bearing loads by employing yieldable means in the connecting rod assembly for limiting the force that can be transmitted from the crank or eccentric to the work member. Without such means the crank and connecting rod must, when starting or stopping, supply the force to extend or compress the coupling spring and this force is by design equal to the accelerating force required to move the work member. The yieldable means yield nearly the full working amplitude of the impulse member before transmitting such a force. The crank and connecting rod thus never supply much more force than that necessary to overcome friction losses and get the system into vibration. The large forces to overcome the inertia of the work member is supplied by the energy stored in the vibrating impulse member.

The reduction in force applied through the shaft bearings and therefore greater efficiency is also obtainable when eccentric weights on the shaft are employed. This is achieved by journaling the shaft in the impulse member and arranging the ratio of masses so that the amplitude of motion of the impulse mass is much larger than the amplitude of motion of the work member. The eccentric weight shaft thus operates through a long stroke with small force to store energy in the vibrating impulse member which in turn is magnified by the resonance condition to produce a much larger force applied to the work member.

Vibratory systems employing vibration generators according to the invention are schematically illustrated in the accompanying drawings.

In the drawings:

Figs. I and II are schematic diagrams of alternative forms of one embodiment of the improved resonant vibration exciter;

Figs. III to V are side elevation views, somewhat diagrammatic in character, of vibrating feeders, conveyors, screens, or like material handling apparatuses which embody the present invention;

Fig. VI is a simplified schematic diagram of an embodiment of the improved generator using eccentric weights;

Fig. VII is a simplified perspective view of a vibratory conveyor employing an eccentric weight drive according to the invention; and Fig. VIII is a graph showing the relative amplitudes of motion of the various parts of the apparatus of Figs. VI and VII.

Referring now in detail to the drawings and first to Fig. I, the resonant vibration exciter is shown as comprising a work-producing mass or member 1, an exciting mass or impulse member 2, a spring 3 interconnecting said members, a cyclical exciting force producing means 4 including an eccentric or crank shaft 5 rotatably supported in bearings 6 carried by said work-producing mass 1 and a connecting rod 7 journaled on the crank pin of said shaft 5 and pivotally connected to said exciting mass 2 through the intermediary of an elastic bushing 8. The entire vibrating system is suspended from the earth or other fixed supporting structure 9 as by means of a relatively weak cushioning spring 10 which supports the vibrating system in space and prevents the transmission of large dynamic forces to the earth or to the supporting structure 9. The power supply for the exciter is herein shown as comprising an electric drive motor 11 also mounted on the earth or supporting structure 9 and operatively connected by belts 12 to said eccentric shaft 5 to cause rotation of the latter. Where belts 12 or equivalent means such as chains are employed, the center line between the belt sheaves 13 and 14 (or chain sprocket wheels) should be generally perpendicular to said connecting rod 7 so that said work-producing mass or member 1 may partake of vibration along the desired path.

As evident, the device illustrated in Fig. I comprises a simple vibrating system with two degrees of freedom suspended in space by a relatively weak cushioning spring 10. When said eccentric shaft 5 is rotated, a cyclical exciting force of constant stroke is impressed simultaneously on said work-producing member 1 and on said exciting mass 2 at a frequency equal to the r.p.m. of said eccentric shaft 5. Said cushioning spring 10 which supports the entire system from said work-producing member 1 permits vibration of the latter; and, because said cushioning spring 10 is very weak relative to said connecting spring 3, its effect, as later explained, in the calculation of the natural frequency of the system may be, from a practical standpoint, entirely neglected. The system is tuned to resonance by varying the speed of rotation of said eccentric shaft 5 until its r.p.m. coincides with the natural frequency of the vibrating system composed of said work-producing member 1, said connecting spring 3, and said impulse member 2. In practice, this tuning to resonance is accomplished either by varying the speed of the drive motor 11, by adjusting the pitch of one or the other of said sheaves 13 and 14 until the ampere draw of said drive motor 11 is a minimum, or varying the weight of the impulse member 2. It has been found that without external work load on said work-producing member 1, the operating ampere draw of said drive motor will be substantially equal to the no-load draw thereof with said belts 12 disconnected.

The elastic connecting bushing 8 deflects during start-up thereby reducing the starting torque to a minimum; and during operation of the vibration exciter, there is a negligible deflection of said elastic bushing 8 because, during resonant operation, the forces which are transmitted through said connecting rod 7 and said bushing 8 are less than one-tenth that of the magnitude of the forces which would otherwise be required if the connecting spring 3 were omitted. When the machine is stopped and the relative motion of the two members 1 and 2 is opposed by the eccentric shaft 5, said elastic bushing 8 again deflects or yields to prevent imposition of excessive stresses on the bearings 6. In fact, an elastic bushing 8 alone is adequate for those conditions of operation wherein the internal elasticity available in said bushing is equal to or greater than one-half the total amplitude of vibration of the two masses 1 and 2. However, when the total amplitude of vibration exceeds these limits, supplementary elastic means such as those illustrated and described with reference to Figs. III and IV should be provided in the drive connection.

An outstanding feature of the present invention, as will be more particularly pointed out in the ensuing description, is that the weight of the impulse member 2 for best results is substantially less than the weight of the work-producing member 1 to provide an extremely simple arrangement in actual machines; and moreover, the natural frequency of the system approaches a function of the weight of the impulse member 2 and the spring constant of the connecting spring 3 so that the work load on the work-producing member 1 has negligible effect on the resonant frequency of the system.

Another feature of the invention as illustrated in Fig. I (and in the remaining figures) is that both the impressed cyclical force and the force of the connecting spring 3 act directly on the work-producing member 1; and, therefore, said forces jointly supply the force to overcome the inertia of the work member 1 and the friction load. When properly tuned the spring 3 alone supplies the accelerating forces required by the work member 1.

Figure II shows schematically the same system except that the crank shaft has been moved to the impulse member. Accordingly, similar reference numerals with a suffix are employed. The operation is the same as that just described since the sole function of the crank connecting rod assembly is to drive the impulse member 2 relative to the work member 1 and it makes no difference which member carries the shaft and which the resilient bushing.

In Fig. III, which is somewhat diagrammatic in character, and which has the same reference numerals as in Fig. I to denote like parts, there is illustrated a feeder, conveyor, screen, or like work-producing member 1 suspended from a fixed support or from the earth 9 by means of cushioning springs 10, the work-producing member 1 constituting, for example, a conveyor pan or a screen deck. The bearings 6 for the eccentric shaft 5 may be fixedly mounted on either the work-producing member 1 or the impulse member 2 (herein the work-producing member 1) and the connecting rod 7 from said shaft 5 is pivotally connected through elastic bushing 8 to the other member (herein the impulse member 2). A connecting spring 3 is fixedly connected at one end to the work-producing member 1 and at the other end to the impulse member 2 and the line of action of the impressed cyclical force and the force of said connecting spring 3 is preferably inclined with respect to the horizontal plane of the material supporting surface of said work-producing member 1, such inclination generally being between 10° and 45° so as to impart an inclined directional throw motion to said work-producing member 1 as indicated by arrow 21 for the progressive movement or processing of the material carried thereon.

Substantially straight-line motion of said exciting member 2 is maintained as by means of a connecting link 22 pivotally connected to said work-producing member 1 through an elastic bushing 23 and to the exciting mass through the elastic bushing 8. In this case, the power supply again is in the form of an electric drive motor 11 which is fixedly attached to a supporting structure or to the earth 9 and is operatively connected to the eccentric shaft 5 as by means of flexible belts 12 and sheaves 13 and 14 on the drive motor shaft and said eccentric shaft. As in Fig. I, the center line between the drive motor shaft and the eccentric shaft should be approximately perpendicular to the line of action to enable vibration of said work-producing mass 1 in the inclined direction shown by the arrow 21. It is to be noted that in the Fig. III construction, settling of the system by variation of external work load on the work-producing member 1 is in a vertical direction, whereby the direction of vibration is not changed as is the case in some vibrating systems wherein the cushioning springs 10 are in the form of leaf springs perpendicular to the path of vibration. The principle of operation of the Fig. III construction is basically the same as that of the Fig. I construction; and, therefore, repetition of the operation is not deemed necessary.

Because the construction illustrated in Fig. IV is substantially the same as the construction illustrated in Fig. III, like reference numerals have been used to designate the same or equivalent parts. The principal difference in the Fig. IV construction is the addition of a pair of elastic torsion bushings 25 pivotally connected through lever 26 between the connecting rod 7 and the impulse member 2, the function of these elastic bushing 25 in leverage being to increase the permissible relative displacement of the members 1 and 2 as contrasted to a single bushing which acts in tension-compression only. In other words, the function of these elastic torsion bushings 25 is to allow a greater amplitude of motion of the connecting rod 7 and the impulse member 2 during the starting and stopping periods; but, at the same time, said bushings 25 have sufficient internal torsional resistance to remain substantially undeflected under the small forces transmitted at operating speeds which are equal to or are nearly equal to resonant frequency. In this form of the invention, the connecting link 22 connects between members 1 and 2 through elastic bushings 8 and 23.

In Fig. V is illustrated still another apparatus which is generally the same as those illustrated in Figs. III and IV, said Fig. V apparatus distinguishing essentially in the provision of a hydraulic dash pot 35 similar to an ordinary shock absorber connecting one end of the lever 36 through its torsion bushing 37 to a bushing 38 which is fixedly attached to the work-producing member 1. The other end of lever 36 is connected through an elastic bushing 39 to the impulse member 2 and the connecting rod 7 is connected intermediate the ends of lever 36 through elastic torsion bushing 40. Because of the inherent characteristics of a hydraulic dash pot or shock absorber 35, very slow out-of-phase motion between the connecting rod 7 and the exciting member 2 can and will automatically take place when only small opposing forces are present but on the other hand, the extremely high resistance of the dash pot 35 to rapid movement or reversal of direction eliminates the possibility of out-of-phase motion at the higher operating speeds whether near resonance or not. Any type of coulomb or viscous dash pot in which the resistance to motion is independent of or proportional to the velocity will satisfactorily answer the requirements of this arrangement. Therefore, a sliding frictional device would theoretically be satisfactory; but, from a practical standpoint, it has been found that an ordinary automotive shock absorber serves to best advantage.

In an actual physical embodiment of the general type of machine illustrated in Figs. III to V as for example the one shown in Fig. III, the work-producing member 1 had a weight of 105 lbs., the exciting member 2 had a weight of 10 lbs., the eccentricity of the shaft 5 was ½ inch to produce a total vibratory amplitude of 1 inch, and the natural frequency was 1469 c.p.m. The work-producing member 1 had an absolute amplitude of ⅛ inch with respect to the earth 9, and the exciting member 2 had an absolute amplitude of ⅞ inch with respect to the earth 9 and these two absolute amplitudes were 180° out-of-phase. At resonance, the ampere draw of the drive motor 11 was less than 1% greater than the no-load draw of the motor with the belts 12 disconnected. By removing the connecting spring 3 and otherwise leaving the machine unchanged, the ampere draw of the drive motor was 150% greater than the no-load ampere draw. When this Fig. III machine was operated underneath a bin on which was imposed a four-foot static head of sand, there was no apparent dampening of the relative amplitude of vibration and the absolute amplitude of vibration of the work-producing member 1 with respect to the earth 9 dampened only very slightly.

While coil springs 3 and 10 are herein employed, it will be apparent that springs 10 in Figs. III to V may be replaced by rubber bands, longitudinally inflexible cables or the like having their ends secured to support 9 and to member 1 and being disposed to offer low resistance to vibration of member 1 and that springs 3 (and guide arms 22) may be replaced as by leaf springs having their ends secured to members 1 and 2 as at the points 8 and 23.

While several embodiments of the invention have been illustrated and described, it will be apparent to those versed in the art that these various combinations may be recombined as desired and other arrangements worked out which are not specifically illustrated herein.

In all of the resonant vibration exciters herein depicted, the cushioning springs 10 will be relatively weak as compared with the connecting springs 3; and if the former, that is springs 10, are selected so that the natural frequency of the entire vibratory system supported thereby is about one-fifth of or less than one-fifth of the natural frequency of the system comprising the work-producing member 1, the connecting spring 3, and the exciting member 2, the entire system for all practical purposes, has but one natural frequency as computable by the formula:

$$Fn = 187.8\sqrt{\frac{K}{W_1} + \frac{K}{W_2}}$$

wherein $Fn$ is the natural frequency in c.p.m.; $K$ is the connecting spring 3 rate in lbs./in.; $W_1$ is the weight of the work-producing member 1 in lbs.; and $W_2$ is the weight of the exciting member 2 in lbs.

By analyzing the foregoing formula, it is apparent that, for most practical applications wherein the exciting member 2 is small compared to the work-producing member 1, the effect of the external work load will have only a negligible effect on that natural frequency of the system; and, furthermore, so long as the accelerations of the work-producing member 1 exceed the acceleration of gravity, there will be a period of time during each cycle in which the reaction of the external work load will be zero, and at this time the system will automatically return to its pre-set resonant period.

Following is an example to show the negligible effect of the work load on the natural frequency of the system. In this example, $W_1$ equals 100 lbs.; $W_2$ equals 10 lbs.; and $K$ equals 1,000 lbs. per inch. Therefore:

$$Fn = 187.8\sqrt{\frac{1000}{100} + \frac{1000}{10}} = 187.8\sqrt{110} = 1969 \text{ c.p.m.}$$

Now if the work load effectively doubles the weight $W_1$ of the work-producing member 1, then:

$$Fn = 187.8\sqrt{\frac{1000}{200} + \frac{1000}{10}} = 187.8\sqrt{105} = 1924 \text{ c.p.m.}$$

Therefore, the natural frequency changes less than 2.5% although the effective weight $W_1$ of the work-producing member 1 has been doubled. It is, therefore, apparent that where, for example, a 5% deviation can be tolerated in a natural frequency machine, a considerable change in the effective weight $W_1$ of the work-producing member 1 may be effected, whereby the machine is operated in resonance regardless of the variation in the external work load.

In each of the systems just described the vibration generator comprises the impulse or exciter member 2 that is resiliently connected to the work-producing member 1 by the spring 3 and the driving force is exerted by crank or eccentric means acting between the two members. To avoid the transmission of large acceleration forces (when the members are at the ends of their strokes) through the crank and connecting rod bearings the spring 3 is adjusted to produce the accelerating forces at the normal operating speed. Then, to reduce the bearing load during operation at lower speed the effective connecting rod is made yieldable preferably by a friction device. Resilient means as indicated in Figs. III and IV, while they reduce the starting forces do not limit the amplitude if the drive motor tends to speed up or the work member increases in weight. In either case the resilient connection acts as a spring in parallel with the spring 3 and the maximum amplitude is limited by damping alone.

If the shock absorber 35 of Fig. V be replaced by a mass hung on the end of the lever 36, a similar resonance condition may obtain with the added weight adding, in effect, to the impulse member 2. At the speed of resonance of this system the amplitude is quite large being limited only by damping. Furthermore, in this mode of vibration the crank and connecting rod are subjected to forces much larger than the forces required for normal operation.

The shock absorber acts to absorb energy whenever the relative amplitude of vibration of the impulse member 2 with respect to the work member 1 tends to differ either more or less from the amplitude of the drive as determined by the crank 5 and lever 36. If the amplitude of motion of the impulse member 2 is low the reaction force from the shock absorber tends to increase the amplitude. If the amplitude is too large the direction of motion at the shock absorber is reversed and it reduces the amplitude of motion of the members. At low amplitudes of motion below the resonant frequency of the system the shock absorber acts against the spring force to balance the inertia forces of the impulse member, while above such frequency it acts with the spring to balance the larger inertia forces. At larger amplitudes the effect is reversed to limit the amplitude. Because there is no energy storage in the shock absorber it acts to control the amplitude without introducing other resonant frequencies.

The principle of reducing the load on the eccentric shaft bearings by the use of resonance may also be applied to systems using eccentric weights.

Thus, as indicated schematically in Fig. VI, the system may comprise a work-producing member 51 that is resiliently connected to an impulse member 52 by means of a coupling spring 53. Force is applied to the impulse member 52 by a vibration force generator comprising a shaft 55 journaled in bearings 56 in the impulse member 52. The shaft 55 carries eccentric weights 57 the unbalanced force of which is transmitted through the shaft bearings to the impulse member 52. The eccentric weights 57 are exemplary of means carried on the impulse member 52 and constrained to move in a circular path with respect to the member. Other examples may include solid or liquid means driven around a circular track or channel in the impulse member 52 and acting directly on the impulse member.

The system is supported from earth or a frame 59 by means of soft springs 60 or other resilient means. If the system is to vibrate horizontally it may be hung by cables and allowed to swing like a pendulum.

The shaft 55 carrying the eccentric weights 57 is driven by a motor 61 connected through a belt 62 to the shaft 55. To adjust the speed of the shaft 55 the motor 61 may be of a variable speed or variable diameter pulleys may be used with the belt 62.

This arrangement adapted for use as a vibratory feeder or conveyor is shown in Fig. VII. Similar reference numbers are used to identify the corresponding parts. The work-producing member 51 appears as a conveyor trough suspended on cables 60. Other forms of work members may be substituted. The impulse member 52 is guided by links 65, which might also be leaf springs, to move along a path parallel to the desired vibration of the conveyor 51.

According to the invention the weight of the impulse member 52 is made small compared to the weight of the work member or conveyor trough 51 and is allowed or caused to vibrate at a much larger amplitude of motion. The phase and amplitudes of motion of the members as a function of frequency or speed of rotation of the weights 57 is shown in Fig. VIII. The amplitude of motion transverse to the line of action of the spring 53 is not shown since it is dependent only on the total weight of the members as linked by the links 65 and stiffness of the support springs 60. In the operating range the amplitude in this direction is relatively constant and equal to the eccentricity of the weights 57 divided by the ratio of the total weight of the members to the weight of the eccentric weights 57.

In the direction of the line of action of the spring 53 the amplitudes vary with frequency in a more complex manner. At extremely low speeds the amplitudes are very small and are determined largely by the resiliency of the support springs 60 and the centrifugal force of the weights 57. As the speed or frequency is increased a first resonant frequency $F_1$ is reached where the members 51 and 52 having masses $M_1$ and $M_2$ respectively vibrate at amplitudes determined by the frictional losses in the system. In the figure a positive amplitude is in phase with the weights 57. After passing the first resonant frequency the members are vibrating out-of-phase with the eccentric weight with the centrifugal force of the weights 57 adding to the spring force to supply the accelerating force.

Upon a further increase in speed a frequency $F_3$ is reached at which the centrifugal force of the weights exactly balances the inertia force of the larger member $M_1$ and the smaller member $M_2$ then remains substantially at rest under the equal and opposite forces. Any frictional losses are supplied by a small movement of the member $M_2$ occurring in phase quadrature, lagging or leading about 90°, with respect to the movement of the weights 57 or member $M_1$.

As the speed is raised still further the centrifugal force increases causing the impulse member 52, the mass $M_2$, to move in phase with the eccentric weights and more or less independently of the work member 51. In other words, the impulse member 52 and spring 53 now constitute a vibrating system supported on the work member 51. The member 52, as the speed of the shaft is further increased, reaches a resonant condition with the spring 53 as the second resonant frequency $F_2$ is reached. Since the work member 51, the mass $M_1$, is not rigidly mounted it yields or moves in response to the vibratory forces transmitted through the spring 53 in an amount such that its inertia force balances the spring force. Hence, the ratio of movements of the work member 51 to impulse member 52 is inversely as the ratio of their weights. Further, this movement of the work member 51 raises the resonant frequency over what it would be with an infinite mass for $M_1$.

The vibratory movement of the impulse member 52 at or near the second resonant frequency $F_2$ may be induced by a relatively small cyclical force from the eccentric weights 57. These small forces, regularly repeated, store energy in the vibrating system of impulse member 52 and spring 53 just as repeated firing strokes of a gasoline engine store energy in the engine's fly wheel. This stored energy appears alternately as kinetic energy in the moving members and potential energy in the stretched or compressed spring. The important feature from an operating standpoint is the fact that the large forces to accelerate and decelerate the work member 51 are obtained without imposing corresponding large forces on the shaft bearings or on the supports 59. By obtaining these forces through the tuned resonant system of impulse member 52 and spring 53 relatively high efficiency is obtained.

In a practical system the amplitude of vibration of the work member and hence the accelerating forces applied to it may be at least five times the amplitude that would be impressed by the eccentric weights alone. In Fig. VIII the amplitude of motion of $M_1$ at $F_3$ is the same as would be impressed by the eccentric weights acting alone while the increased amplitude in the operating range is a result of operating the system near the second resonant frequency.

In all of the systems herein described the actual weight of the vibration generator or impulse member is kept small compared to the weight of the work-producing member so that the effect of change in weight or load has little effect on the resonant frequency of the system. Likewise, the effect of damping is minimized because the load has no effect on the damping of the coupling spring 53 and damping of the movement of the work member 51 is effective only as it affects the spring 53.

If desired the system shown in Figs. VI and VII may be equipped with stops to limit the amplitude of movement of the members. Here again the resonant systems offer advantages over the non-resonant systems in that the stops may be arranged to act on the impulse member 52 which has a relatively small mass and is thus easier to stop.

In conclusion, it is apparent that the present resonant vibration exciters as disclosed herein fulfill the previously recited objects of the invention and have the necessary attributes for desired operation which are lacking in prior art structures. Thus, the present constructions as illustrated in Figs. I to V have a positive relative amplitude between the work-producing member 1 and the exciting or impulse member 2, and, in addition, in all of the forms of the invention disclosed herein, there is a resilient suspension between the system and the earth or other supporting structure. Moreover, the present constructions are actually resonant and will not critically dampen under external work load nor will they become self-destructive when the work load is removed after the system has been brought up to the desired amplitude of vibration under the external dampening load. As pointed out in the introductory portion of this disclosure, certain of the prior art structures utilize a constant cyclical force-producing means whereby the amplitude of vibration varies during operation under changing work load, while in the present case the force is variable but the relative amplitude, is constant.

Further summarizing the present constructions and comparing the same with prior art, there is here provided an exciting member which has a relatively small weight compared to the work-producing member and the exciting force in most instances acts on both the work-producing member and the exciting member and is variable in magnitude as required, whereas in certain prior art structures the masses of the members are usually approximately equal to each other and the exciting force acts only on the exciting member with constant inertia force. Insofar as the load damping force is concerned, in the present case this force acts on the work-producing member only and is resisted by the exciting force directly, whereas in certain prior art structures, the load dampening force, while acting on the work-producing member, cannot be resisted by the exciting force directly.

The development of a natural frequency vibration exciter as herein described is based on an entirely new principle and basically involves two members—a work-producing and an exciting member—suspended in space by very weak cushioning spring or equivalent means, the two members being connected together by a relatively stiff connecting spring and being acted on by an alternating exciting force in such a manner that the maximum relative amplitude of the members remains constant or may be controlled by speed control of the driving motor. External useful work is done by one member only—that it, the work-producing member—and the supporting or cushioning spring supports the entire system in space and is so designed as best shown in Figs. III to V, that it has practically zero stiffness in the direction of vibration as denoted by the arrow 21 in said figures.

As discussed in connection with each of the several figures, the work-producing member becomes the conveyor pan, the screen deck, or may be the impacting member which acts on the chisel point of a vibrating hammer, the bed of a truck which is to be unloaded by means of directional throw vibration, the body of a railroad car to be unloaded, the support for foundry molds or containers for material compactors, liquid mixers, or any other bodies on which work is to be done by means of simple harmonic vibrations.

While in the example previously given the ratio between the weights $W_1$ and $W_2$ of the work member and impulse member is 10:1, it is to be understood that the ratio can be less but, of course, the work load on the work-producing member cannot change the effective weight $W_1$ to the same extent as in the example given since, in this case, the natural frequency change becomes greater than desired. However, it has been found that with moderate changes in work load on the work-producing member, the ratio $W_1:W_2$ may be approximately as low as 5:1 and even less in cases where light, fluffy materials are being handled by the work-producing member.

Other modes of applying the principle of the invention may be employed, change being made as regards the details described, provided the features stated in any of the following claims, or the equivalent of such, be employed.

This is a continuation-in-part of our application Serial No. 331,714, filed January 16, 1953.

Having described the invention, we claim:

1. A mechanism for performing work by vibration comprising, in combination, a performance mass to be vibrated along a work path, an impulse mass that is of substantially less weight than the performance mass and that vibrates along a drive path parallel to the work path, guide means coupling the impulse mass to the performance mass adapted to restrict said impulse mass to said drive path, resilient means connecting said performance mass to said impulse mass and forming with said masses a vibratory system having a resonant mode of vibration in which said masses move in opposite directions with absolute motions that vary generally inversely as their weights, means for supporting said system with the masses free to vibrate, and means for periodically driving said impulse mass along its path at a frequency near but less than the natural frequency of said resonant mode of vibration.

2. A mechanism according to claim 1 wherein the drive for the impulse mass comprises an eccentric weight carried on a shaft that is journaled in the impulse mass and that is rotated at a speed near but less than the natural frequency of said resonant mode of vibration.

3. A mechanism according to claim 2 wherein the eccentric weight comprises from two to twelve percent of the weight of the impulse mass.

4. A mechanism according to claim 1 in which the weight of the impulse mass is less than half and more than one twelfth of the weight of the performance mass.

5. In a machine for doing work by vibration, in combination, a work member for doing work by vibration, an impulse member, a spring supporting the impulse member from the work member and forming with the impulse member a vibratory system the reaction force of which drives the work member, said impulse member having a mass not greater than half the mass of the work member and an amplitude of motion at least double that of the work member, a crankshaft journaled in one of the members, connecting rod means connecting the shaft to the other of the members cooperating with the shaft for applying a force to the impulse member that varies with the angular position of the shaft and that is small compared to the force required to overcome the inertia of the work member at working amplitudes of vibration and means for rotating the shaft at a speed substantially equal to the natural frequency of the vibratory system.

6. In a machine having a work member that does work by vibration, a vibratory force generator comprising, in combination, an impulse member having a mass that is small compared to the mass of the work member, a spring supporting the impulse member from the work member and forming with the impulse member a vibratory system having a natural frequency in which the movement of the impulse member is large compared to the movement of the work member, a crankshaft journaled in one of the members, connecting rod means connecting the crankshaft to the other of the members cooperating with the shaft for applying to the impulse member a force that varies with the angular position of the shaft and that is small compared to the spring force to be applied to the work member, and means for rotating the shaft substantially at the natural frequency of the vibratory system.

7. In a machine for doing work by vibration, in combination, a resiliently supported work member for doing work by vibration, an impulse member having a mass less than half the mass of the work member, a spring interconnecting the members and forming with the members a vibratory system in which the movement of the impulse member is at least double the movement of the work member, a crankshaft journaled in one of the members, a connecting rod connecting the crankshaft to the other of the members for producing forces acting between the members that vary with the angular positions of the shaft and that are small compared to the force required to overcome the inertia of the work member at working amplitudes of vibration, and means for rotating the shaft at a speed approximately equal to the natural frequency of the vibratory system.

References Cited in the file of this patent

UNITED STATES PATENTS

| 1,820,239 | Merz | Aug. 25, 1931 |
| 2,353,492 | O'Connor | July 11, 1944 |
| 2,636,719 | O'Connor | Apr. 28, 1953 |
| 2,730,237 | Linke | Jan. 10, 1956 |

FOREIGN PATENTS

| 630,002 | Germany | May 18, 1936 |
| 828,944 | Germany | Jan. 21, 1952 |